June 1, 1965 F. E. SHASHOUA ETAL 3,187,092

SPEED CONTROL SYSTEM USING PARALLEL CONTROL LOOPS

Filed April 27, 1959 3 Sheets-Sheet 1

INVENTORS
FRED E. SHASHOUA &
ROY C. WILCOX
BY Morris [signature]
ATTORNEY

SPEED CONTROL SYSTEM USING PARALLEL CONTROL LOOPS

Filed April 27, 1959 3 Sheets-Sheet 2

INVENTORS
FRED E. SHASHOUA &
ROY C. WILCOX
BY Morris Rabkin
ATTORNEY

INVENTORS
FRED E. SHASHOUA
& ROY C. WILCOX
BY Morris Rabkin
ATTORNEY

United States Patent Office 3,187,092 Patented June 1, 1965

3,187,092

SPEED CONTROL SYSTEM USING PARALLEL CONTROL LOOPS

Fred E. Shashoua, Wilmington, Del., and Roy C. Wilcox, Haddonfield, N.J., assignors to Radio Corporation of America, a corporation of Delaware Filed Apr. 27, 1959, Ser. No. 809,047
9 Claims. (Cl. 178—6.6)

The present invention relates to control systems, and more particularly to a system for controlling the speed of a moving body, the invention being especially suitable for use in magnetic recording and reproducing apparatus.

Speed control has continually presented problems in recording systems. Even slight deviations in speed of a recording medium produce distortion in the recording and reproduction of sound. In recording and reproducing television signals, the slightest speed variations in the rate at which the recording medium is scanned causes severe distortion of the reproduced television picture. Slight speed variations result in phase variations in the recorded and reproduced television signals. In color television magnetic tape recording and reproduction, the most minute phase variations due to the slightest deviations from constant scanning speeds distorts the color information, since the color information depends upon the phase characteristics of the recorded and reproduced television signals.

Television magnetic tape recording and reproducing instruments which are in commercial use at the present time incorporate means for scanning record tracks disposed transversely across the magnetic tape. These scanning means include a motor driven head wheel carrying a plurality of magnetic heads which consecutively scan successive recorded tracks on the tape. Slight deviations in the speed of rotation of this head wheel from a constant predetermined speed cause errors in scanning of the tape record and produces serious distortion of the television signals.

It will be appreciated that, in practice, the head wheel must start from rest and rotate at progressively greater speeds when a recording or a reproducing process is initiated. It has been difficult to provide a control system which is highly sensitive to speed variations and is also operative over the entire speed range of a moving element such as the rotatable head wheel of a television magnetic tape recording and reproducing apparatus. In particular, control systems which have been provided in the past have not been altogether successful in providing the requisite sensitivity to small speed variations in the vicinity of the desired constant or lock-in speed of the rotating head wheel.

It is therefore an object of the present invention to provide an improved speed control system which is highly sensitive to speed variations and which is operative through a wide range of operating speeds.

It is also an object of the present invention to provide an improved control system having a plurality of control branches primarily operative in different speed ranges and wherein interfering operations among the branches are eliminated.

It is another object of the present invention to provide an improved control system having velocity and position phase responsive circuits which cooperate with each other without interference to provide increased sensitivity throughout the operating range of the system.

It is a still further object of the present invention to provide an improved control system having a plurality of control circuits among which interference is eliminated in their respective regions of maximum sensitivity.

It is a still further object of the present invention to provide an improved control system having increased sensitivity without sacrificing stability.

It is a still further object of the present invention to provide an improved control system less susceptible to noise.

It is a still further object of the present invention to provide an improved frequency discriminator system.

Briefly described, a control system provided in accordance with the present invention is operative for controlling the speed of a moving element, such as a rotatable head wheel of a television magnetic tape recording and reproducing apparatus. Means are provided for obtaining control signals repetitive at a rate determined by the speed of the moving element. Reference signals repetitive at a given rate are also provided. The control system also includes at least two control circuits. One of these control circuits is operative to produce error signals indicative of variations in speed of the moving element very close to lock-in speed. A second control circuit is provided which is operative to detect speed deviations in a range of speeds approaching lock-in speed. Each of these control circuits includes a phase detector. Either the control signals or the reference signals are applied to delay means which effectively provide two signals shifted in phase with respect to each other. These phase shifted signals are applied individually to the phase detectors in each of the control circuits together with the control signals or the reference signals which were not shifted in phase. This phase shift of one of the reference or control signals causes simultaneous operation of the control circuits in regions of different sensitivity. Desirably, the control circuit which operates in a range very close to lock-in speed operates in a region of higher sensitivity than the second control circuit. Accordingly, greater overall sensitivity is provided by the control system without interference among the control circuits. An improved frequency discriminator system provided by the invention may be included in the second control circuit so that the second control circuit is responsive to variations in the velocity of the moving element. The other control circuit may be operated to respond to variations in the position of the moving element.

The invention itself, both as to its organization and method of operation, as well as the foregoing and other objects and advantages thereof, will become more readily apparent from a reading of the following description in connection with the accompanying drawings in which.

Figure 1:
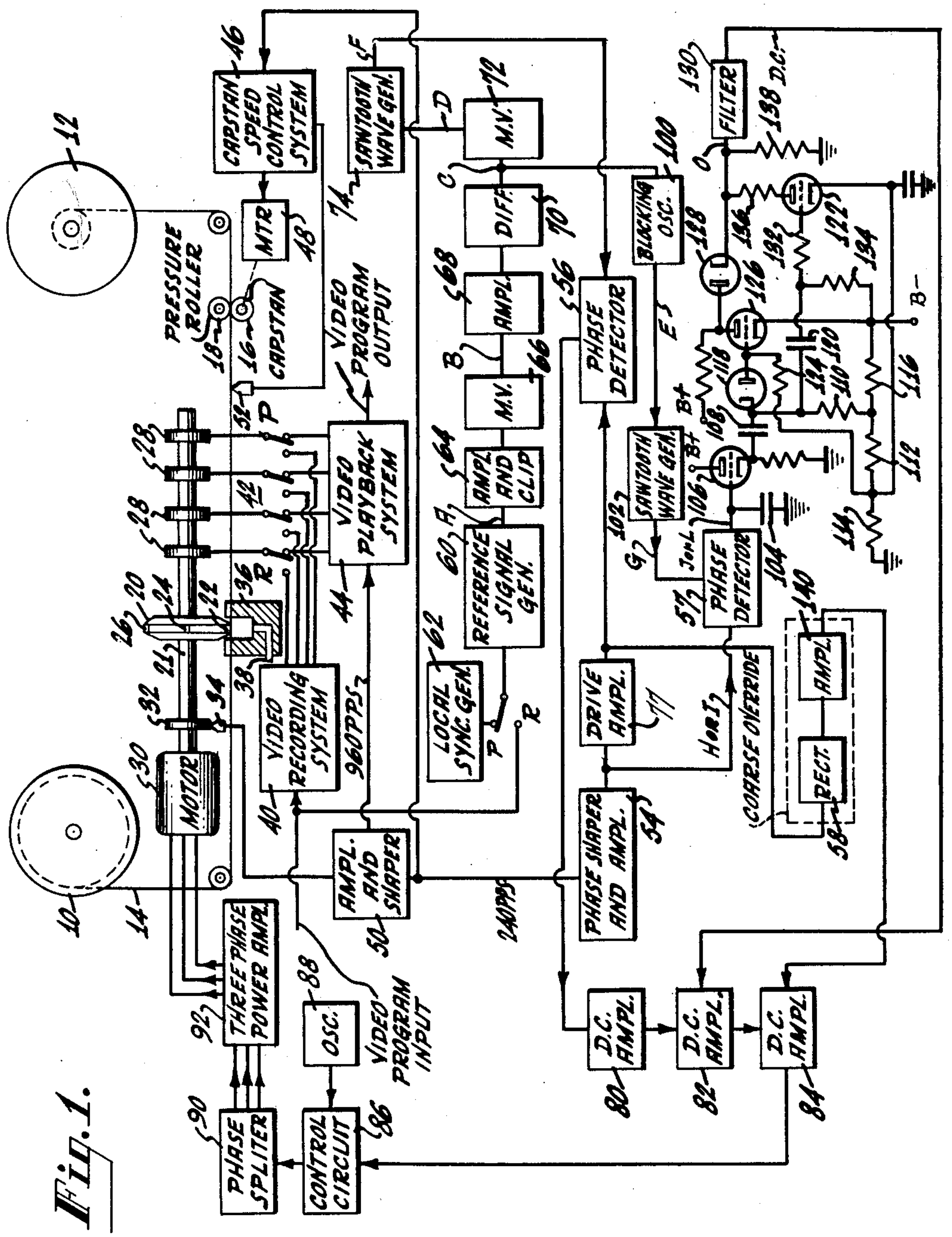
FIG. 1 is a diagrammatic representation of one embodiment of a control system provided in accordance with the present invention and showing schematic diagrams of a circuit used in the system.

In the interest of clarity, some ground symbols have been omitted from FIG. 1 of the drawings, particularly in connection with block diagrams shown therein. Thus, it may be assumed that a ground return is associated with each of the blocks employed in the drawings where necessary.

The present invention will be described hereinafter, by way of illustration, as it is employed in a transverse scan magnetic tape apparatus suitable for recording and reproducing television signal information. As the description proceeds, it will become apparent that the novel features of the invention are not limited to such apparatus.

Referring, now, more particularly to FIG. 1 of the drawings, a tape transport mechanism is shown including a supply reel 10 and take-up reel 12. A tape record 14 is reeled from the supply reel to the take-up reel at a speed determined by the speed of rotation of a capstan 16. The tape is pressed against the capstan 16 by means of a pressure roller 18. The construction of the tape transport mechanism, the means for driving the supply reel 10, the take-up reel 12, and the capstan 16 do not form part of the present invention and are therefore not described herein. A more detailed description of the tape transport mechanism may be found in the article entitled "How the RCA Video Tape Recorder Works" by Jerome L. Grever appearing in Broadcast News Magazine, published April 1958, beginning at page 6. The tape is scanned by means of a rotating head wheel 20 which carries four magnetic heads spaced ninety degrees apart on the head wheel. Three of these heads 22, 24 and 26 are shown in the drawings. The construction of the head wheel is also described in the aforementioned article by Jerome L. Grever and is also described in an application filed on February 2, 1959, in the name of Henry Ray Warren, Serial No. 790,458, now Patent No. 3,046,359, issued July 24, 1962, and assigned to Radio Corporation of America.

The head wheel 20 is driven by an electrical motor 30 at 240 revolutions per second, for example. The motor 30 is a three phase synchronous motor which is normally operated below synchronous speed for control purposes as will be explained hereinafter. Slip rings 28 are mounted on a shaft 21 connecting the head wheel to the motor 30. These slip rings are connected each to a different one of the magnetic heads and are associated with brushes (not shown) for transmitting signals to and from the heads.

A tone wheel 32 is also mounted on the motor shaft and generates a pulse in a tone wheel pick-up 34 during each revolution of the head wheel 20. The tone wheel 32 is mentioned in the referenced article by Jerome L. Grever. The wheel is a member made of a magnetically susceptible material which has an opening therein of predetermined shape. The pick-up 34 is a magnetic transducer having concentric center and outer pole pieces. The center pole piece may be of substantially the same width as the opening in the tone wheel member. As the opening in this member passes over the pick-up transducer 34, any flux flowing through the transducer is decreased and a sharp voltage pulse will appear across the output of a pick-up coil placed around the center pole piece. This tone wheel arrangement is described in greater detail in an application filed on November 20, 1957, in the name of Roy C. Wilcox, Serial No. 697,711, and assigned to Radio Corporation of America.

The tape 14 is conformed to an arc around the head wheel 20 by a vacuum shoe 36 (similar to the vacuum shoe illustrated in the aforementioned Grever article) as the tape is reeled in a direction along the axis of the head wheel 20 from the supply reel 10 to the take-up reel 12. In a typical television tape recording and reproducing apparatus, which is mentioned at this point solely for purposes of illustration, the head wheel 20 is two inches in diameter. The tape 14 is two inch wide magnetic tape which may be made of a one mil thick base of polyester plastic (Mylar) with a 0.0003 inch magnetic oxide coating. The vacuum shoe 36 holds the tape against the head wheel 20 in an arc of approximately one hundred thirteen degrees. The vacuum shoe 36 is connected to a vacuum source (not shown) by means of a hose 38. The tape is driven by the capstan 16 and pressure roller 18 arrangement at fifteen inches per second. The magnetic heads are 10 mils wide in the direction of tape travel. Thus, the scanning mechanism involving the head wheel and the vacuum shoe arrangement will scan, on the tape 14, transverse tracks having a pitch of 15.6 mils with a 5.6 mil blank space between the tracks.

Signals may be recorded on the tape by means of the recording system 40. The television program is applied to this recording system 40. The recording system includes an FM modulator. The television signal on its FM carrier is amplified and used to drive all four magnetic heads through the slip rings 28 as explained in the Grever article. During playback, the magnetic heads are connected through the slip rings and suitable switching arrangement shown in the drawings as a record/playback switch 42 to a playback system 44. This playback system includes amplifiers, response equalizers and a switching system for reconstituting the video signal. The playback system also includes an FM demodulator. The nature of the playback system is not part of the present invention and is described in greater detail in the referenced Grever article.

The speed of the tape is controlled by means of the capstan speed control system 46. This capstan speed control system includes a variable frequency oscillator and a power amplifier for amplifying the signals from the oscillator. These amplified signals are applied to a drive motor 48 which drives the capstan. During recording operations, the signals from the tone wheel are applied to an amplifier and shaper circuit 50 which will be described in greater detail hereinafter. This circuit 50 provides an accurately shaped train of pulses at a rate determined by the speed of rotation of the head wheel 20 which, in the illustrated example, will be at 240 pulses per second.

This tone wheel signal is recorded on the tape by means of a recording amplifier contained in the capstan speed control system 46 which drives a control track head 52. The head 52 records a control track along the edge of the tape 14. During playback, the tone wheel signal derived from the amplifier and shaper 50 is compared in phase with a signal reproduced from the control tracks to provide an error signal which controls the frequency of the variable frequency oscillator in the capstan speed control system 46. The speed of the capstan drive motor 48 is therefore controlled by the system 46 to establish the proper phase relationship between the tone wheel and control track signals. This insures that the video heads track the transverse record tracks recorded across the tape. In other words, the speed of the tape 14 is controlled so that the magnetic heads scan exactly the top of the transverse tracks on the tape and are not misaligned with the tracks.

It is necessary, however, to insure that the head wheel is rotated at exactly the proper speed (240 revolutions per second) during playback, as was the case during recording. The instantaneous positions of the heads during each revolution, which is a phase relationship, must also be constant. This constant speed and phase relationship is maintained with the embodiment of the invention which provides the illustrated control system.

The information derived from the tone wheel 32 indicates both the speed of the head wheel 20 and the position of the magnetic heads thereon. The repetition rate of the signals derived by the pick-up transducer 34 will be indicative of the speed of the head wheel 20. It will be observed that the pick-up transducer 34 is disposed at a fixed position. Accordingly, a tone wheel pulse will be produced once during each cycle of rotation of the head wheel 20. Since the tone wheel pulse will be produced at a certain time during each cycle of the head wheel, the occurrence of the tone wheel pulse at any other time will indicate an error in the position of the heads on the head wheel. These position errors are time errors as pointed out above. Since time may be measured in terms of phase in a cyclically repetitive system, the positions of the heads on the wheel 20 is expressable as phase relationship and may be determined by means of a phase comparison with a reference signal. The signals from the tone wheel are control signals which are amplified and shaped in the amplifier and shaper circuit 50. This circuit 50 provides sharp pulses for each tone wheel pulse. Since the tone wheel pulses will occur at approximately 240 revolutions per second, a 240 pulse per second signal will be provided by the amplifier and shaper circuit 50. This 240 pulse per second signal is applied to the capstan and speed control system 46 for tape speed control purposes as pointed out above. These 240 pulse per second control signals are also applied to another pulse shaper and amplifier circuit 54 for further shaping and amplification before application to control circuits of the illustrated system to be described in detail hereinafter. The first amplifier and shaper 50 also includes a chain of multivibrators of conventional design which multiplies the frequency of the control signals four times to provide 960 pulse per second control signals. These 960 pulse per second control signals are applied to the playback system 44 for controlling the switching of the magnetic heads on the head wheel 20 during playback and for other control purposes as is explained in greater detail in the referred article by Jerome L. Grever.

Three control circuits which form portions of servo loops are provided for controlling the moving system which, in the illustrated case, is the magnetic tape scanning device including the rotatable head wheel 20. Two of these control circuits include different phase detectors 56, 57. The other control circuit includes a rectifier 58. The control circuit including one of the phase detectors 56 is operative over a speed range very close to the constant lock-in speed of the rotating head wheel. The control circuit including the other phase detector 57 is operative over a wider speed range. The control circuit including the rectifier 58 is indicated by being enclosed by the dashed lines as being a coarse override system which exercises control over the system when the rotating head wheel is rotating at relatively low speed, as for example, when the motor 30 is started from rest and is increasing in speed.

Each of the phase detectors 56 and 57 is of conventional design. The phase detector 56 may be a conventional diode bridge type phase detector. The phase detector 57 may be less sensitive and more inexpensive than the phase detector 56 and may include a dual triode tube. The design of the phase detector 57 may be essentially similar to the phase detector designs described in the text "Electronic Instruments" by Greenwood et al. published by McGraw-Hill (1948) Section 12.12.

Reference signals are provided for comparison with the control signals in the phase detectors 56 and 57. These reference signals are obtained from a reference signal generator 60. The reference signal generator 60 includes amplifier circuits and conventional vertical sync separator circuits of the type used in television receivers to provide a pulse signal. During recording operations reference signals are obtained from the video program input and applied to the reference signal generator 60. During playback reference signals are obtained from a local sync generator 62. The local sync generators may be a conventional studio sync generator such as the TG-2A Studio Sync Generator manufactured by Radio Corporation of America, Camden, New Jersey, and described in their Instruction Bulletin 1B-36155.

The reference signals provided by the reference signal generator may be 60 cycles per second signals timed with the 60 pulse per second repetition rate of the vertical sync obtained from the video program input or from the local sync generator. In the illustrated case, however, the reference signal generator includes a pair of multivibrator circuits of conventional design which are triggered by the vertical sync signals to provide a reference signal repetitive at 240 pulse per second. This reference signal output of the reference signal generator is illustrated in waveform A of FIG. 2. The reference signal is amplified and clipped in the amplifier and clipper stage 64 and applied to a multivibrator 66 of the monostable type. Multivibrator circuits of a suitable type are described and their application explained in Patent 2,857,512. The multivibrator 66 is designed so that the duration of the pulse obtained from the multivibrator is equal to one-half the interval between successive reference signal pulses. In other words, the time required for the multivibrator 66 to recycle is equal to one half the interval between successive reference signal pulses. The multivibrator 66 therefore provides an output square wave as is shown in waveform B of FIG. 2. An amplifier stage 68 of conventional design amplifies and inverts in polarity the output square wave from the multivibrator 66. This inverted square wave is then differentiated by a conventional resistance-capacitance differentiating circuit 70 which provides a differentiated output signal such as indicated in waveform C of FIG. 2. It will be noted that the negative going pulses from the differentiating circuit are timed exactly with the reference signal pulses from the reference signal generator 60. These negative going pulses from the differentiator 70 are applied to trigger another multivibrator circuit 72 of essentially similar design as the multivibrator circuit 66. However, the time of recycling of the monostable multivibrator 72 is much smaller than the time for recycling of the multivibrator 66 so that symmetrical square wave signal is not produced as was the case for the multivibrator 66. The duration of the output pulse from the multivibrator 72 may be a fraction of the interval between successive reference signal pulses. In the illustrated case, the duration of the output pulse from the multivibrator 72 is approximately one-hundred microseconds. The output signal from the multivibrator 72 is shown in waveform D of FIG. 2. The duration of the pulse from the multivibrator 72 is indicated as $T_{RP}$ in the drawings.

A sawtooth wave generator 74 is triggered by the output pulse from the multivibrator 72. This sawtooth wave generator may be a conventional sawtooth generator having a capacitor which is discharged through a vacuum tube. The trace portion of the sawtooth wave occurs during the time that the capacitor is being charged, while the retrace portion occurs during the discharge of the capacitor. The output pulse from the multivibrator 72 is applied to the sawtooth wave generator to effect the discharge of the capacitor by, for example, causing conduction in the discharge tube of the sawtooth generator. Accordingly, the retrace portion of the sawtooth wave will occur during the interval of the output pulse from the multivibrator 72. This sawtooth wave will also have a predetermined amplitude determined by the operating voltage amplitude and circuit constants therein. The sawtooth wave output of the sawtooth generator 74 is indicated by waveform F of FIG. 2.

While a sawtooth generator is described in connection with this illustrative embodiment of the present invention, other circuits which will provide a wave having a sloping edge portion may be used. This sloping edge portion will, as in the aforementioned case, occur upon occurrence of the output pulse signal from the multivibrator 72. Thus, for example, a trapezoid wave generator may be used in place of the sawtooth wave generator. The sloping edge of the trapezoid wave will be timed to occur upon occurrence of the output pulse of the multivibrator 72.

The sawtooth wave (FIG. 2–F) from the sawtooth wave generator 74 is applied to the phase detector 56 wherein it is compared in phase with the control signals. The control signals applied to the phase detector 56 are further amplified in a drive amplifier 77. These control signals are shaped to be sharp pulses. The phase detector produces an error signal when the control signal pulses and the sawtooth waves applied thereto are not in desired phase relationship. Since the retrace portion of the sawtooth wave is timed to occur upon occurrence of the reference signals, as will be obvious from FIG. 2 of the drawings, the phase detector 56 produces approximately zero output voltage if the control signals and the reference signals are in phase with each other. When the control signals and the reference signals are in phase, the control pulse from the drive amplifier 77 will occur at the midpoint of the steep retrace portion of the sawtooth applied to the phase detector 56. This midpoint is indicated in the drawings, FIG. 2, as $t_0$. Since the retrace portion of the sawtooth is steep, the phase detector is sensitive to minute phase variations between the reference signals and the control signals which will occur if the control signal from the tone wheel is not produced at the exact time $t_0$ during each cycle of rotation of the head wheel 20. The phase detector 56 is therefore responsive to the instantaneous position of the head wheel 20.

It will be recalled that the duration of the retrace portion of the sawtooth wave F is equal to the duration of the pulse from the multivibrator 72, $T_{RP}$. Thin interval $T_{RP}$, which in the illustrated case is one hundred microseconds, is therefore the interval of time over which the phase detector 56 is effective in providing an error signal. The amplitude of the sawtooth wave varies between the maximum peak to peak value thereof during the time $T_{RP}$. Thus, small position (phase) variations of a few microseconds produce relatively large output error signals. The phase detector will produce a direct current output error signal which varies in polarity and magnitude in accordance with minute phase variations between the control signals and the reference signal and therefore minute variations in position of the rotating heads on the head wheel during each cycle of rotation thereof. These variations in position and phase accompany slight variations in the speed of the head wheel 20 which are in the immediate vicinity of the lock-in speed of the rotating system. The output signals from the phase detector 56 are therefore error signals indicative of phase and position variations of the rotating head wheel. Thus, the control circuit including the phase detector is operative as a phase or position control circuit.

This error signal from the phase detector 56 is applied to a direct current amplifier 80 wherein its amplified signal is again amplified in a direct current amplifier 82 and further amplified in a third direct current amplifier 84. These direct current amplifiers are of conventional design and are essentially successive direct current amplifier stages. The direct current amplifiers 82 and 84 are controlled by the control circuit including the other phase detector 57 and the coarse override control circuit including the rectifier 58, respectively. The amplified signals from the last direct current amplifier stage 84 are applied to a control circuit 86. Signals from an oscillator 88 are also applied to the control circuit 86. The oscillator 88 has a sine wave signal frequency output of approximately 340 cycles per second. The control circuit modulates the power output of the oscillator by controlling the amplitude of the oscillations intermediate thereto in accordance with the error signal from the last direct current amplifier stage 84. These modulated oscillations are applied to a phase splitter circuit 90 which provides three phase signals from the single phase signals from the oscillator. These signals are amplified in a three phase power amplifier 92 which may be an individual amplifier for each phase signal. The three phase power amplifier 92 powers the A.C. motor 30. Since the A.C. motor 30 is operated below synchronous speed variations in the driving power thereto cause the motor 30 to change speed and therefore cause the head wheel 20 to rotate at the desired constant lock-in speed. Motor speed may alternatively be controlled by use of a variable frequency system as described in connection with the capstan speed control system 46, or by use of an electromagnetic brake, as described in Patent No. 2,854,526.

It will be noted that the steep sloping portion of the sawtooth wave applied to the phase detector 56 provides greater sensitivity for small phase differences. Accordingly, the amplitude of this sawtooth wave (FIG. 2–F) may be relatively small as compared to the amplitude of waves usually applied to phase detectors in servo systems in order to obtain an output error signal. Accordingly, leakage of signals between the various components and particularly the bridge diodes in the phase detector is minimized since the potential differences across these components is small. Since this leakage is exhibited as noise, the noise produced in the control circuit including the phase detector 56 is much smaller than the noise produced in conventional servo control circuits using phase detectors.

To bring the speed within grasp of the above "fine" phase control system, there is employed a wide range speed control circuit, or a wide range control. This wide range control circuit includes another phase detector 57 and operates by comparing control signal pulses from the pulse shaper and amplifier 54 with reference signals from the reference signal generator 60. These reference signals are delayed with respect to the reference signals applied to the phase detector 56 by one-half a wave position by appropriate phase control circuits, i.e., the multivibrator 66. The control circuit including the phase detector 57 is associated with an auxiliary circuit for deriving the rate of change of the error signals obtained from the phase detector 57. Accordingly, the control circuit including the phase detector 57 provides an error signal indicative of the rate of change of instantaneous position or velocity of the rotating head wheel 20. Accordingly, the control circuit including the phase detector 57 is operative as a velocity control circuit. This velocity control circuit is independent of the phase or position control circuit including the first phase detector 56. As will be explained hereinafter, the sensitivity of the velocity control circuit is negligible for small changes in speed of the rotating head wheel whereas the velocity control circuit is highly sensitive for speed changes of a larger magnitude. The position or phase control circuit is highly sensitive to such small changes in speed. Therefore, the phase and position control circuit and the velocity control circuit cooperate without interference to provide high sensitivity to speed variations throughout most of the operating range of the controlled rotating system.

Figure 2:
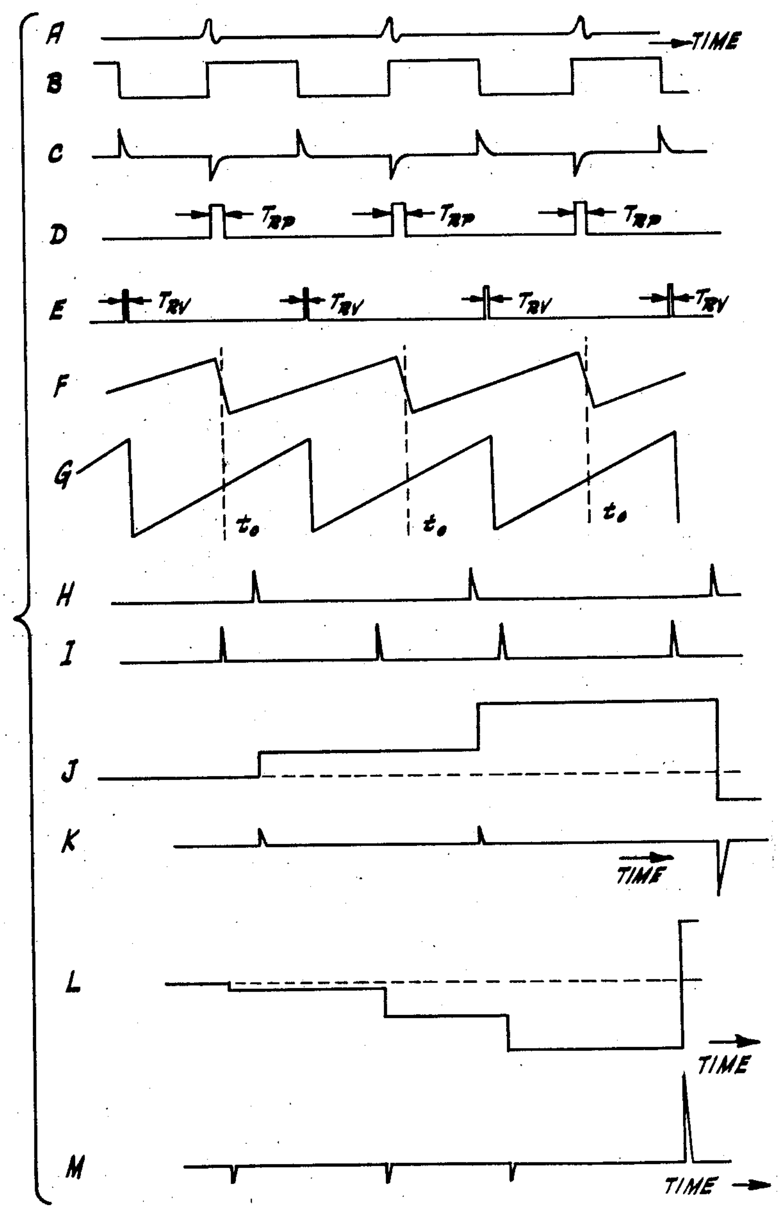
FIG. 2 is a series of waveforms of signals in the system and circuit illustrated in FIG. 1.

The reference signals for application to the velocity phase detector 57 are derived from the positive going impulses of the differentiated signal obtained from the differentiating circuit 70 (wave form C, FIG. 2). These positive going impulses are used to trigger a blocking oscillator circuit 100. This blocking oscillator circuit may be a conventional triggered oscillator circuit. The blocking oscillator circuit produces an impulse of short duration such as shown in waveform E in FIG. 2. The duration of this impulse is indicated as $T_{RV}$ and may be, in this illustrated embodiment of the present invention, approximately three microseconds. This impulse is used to trigger a sawtooth wave generator 102 of conventional design. This sawtooth wave generator may be of the Miller integrator type to provide a highly linear trace. The retrace edge of this sawtooth is timed to occur upon occurrence of the trigger signal from the blocking oscillator 100. This retrace portion will therefore be very sharp as compared to the trace portion. In addition, the amplitude of the sawtooth wave provided by the sawtooth wave generator 102 is desirably several times the amplitude of the sawtooth wave derived from the sawtooth wave generator 74. It was explained previously that it is desirable to use a relatively low amplitude sawtooth wave for application to the sensitive phase detector 56 in the phase or position control circuit. The sawtooth wave G may, for example, be 70 volts or maximum peak to peak amplitude, whereas the sawtooth wave F from the sawtooth wave generator 74, which is applied to the phase detector 56, may be approximately 12 volts peak to peak amplitude in this illustrative case. The sawtooth wave applied to the velocity phase detector 57 is shown in waveform G of FIG. 2. It will be noted that the sawtooth wave G is effectively delayed with respect to the sawtooth wave F. In other words, the reference signal applied to the velocity phase detector 57 is shifted in phase with respect to the sawtooth wave applied to the phase and position phase detector 56. It will be noted that the time $T_0$ occurs during the trace portion of the sawtooth wave G while this time $T_0$ occurs during the retrace portion of the sawtooth wave F. Since the slopes of the trace portion of wave G are much smaller than the slopes of the retrace portion of the wave F, the velocity phase detector will be less sensitive to phase variations around the time $T_0$ than the phase and position phase detector 56. Thus, the velocity control circuit will be less sensitive than the phase and position control circuit around the lock-in phase and frequency of the rotating system. This difference in sensitivity is a feature of the present invention. Since the sensitivity of the two control circuits varies around the lock-in frequency, both control circuits can be highly sensitive in their respective regions of operation without interference and without reduction in overall sensitivity of the control system.

The control signal pulses which are applied to the phase detector are sharp velocity impulses and are illustrated for two conditions of operation of the system in waveforms H and I. The control signals in waveform H would be produced when the speed of the rotating head wheel is decreasing and the control signal in waveform I will occur when the speed of the rotating head wheel is increasing.

The velocity phase detector 57 may be of simple construction as pointed out above since the amplitude of the sawtooth wave is relatively high. The output voltage of this phase detector 57 is applied across a capacitor 104. When the control signals are in phase with the reference signals and occur at the times $T_0$ upon occurrence of the center of the trace portion of the sawtooth wave G, zero output voltage is obtained from the output of the phase detector 57 so that no charge is stored in the capacitor 104. However, should the control signals be out of phase with the reference signals, an output voltage is obtained from the phase detector which causes the capacitor 104 to charge so that a positive or negative voltage appears at the output of the phase detector 57. The discharge time constant of the circuit associated with the capacitor 104 is such that the capacitor does not discharge for several cycles of rotation of the rotating head wheel 20 and therefore for an interval equal to the duration of several control signals.

The voltage across the capacitor 104 is applied to a cathode follower stage 106. A differentiating circuit including a capacitor 108 and resistors 110, 112, 114 and 116 is connected to the output of the cathode follower. The resistance of the resistor 110 may be higher than the resistance of the resistors 112, 114, and 116 and is therefore controlled in the differentiating circuit. The output of this differentiating circuit is transmitted through a diode 118 which is polarized to block all positive portions of the signals and also a small portion of the negative signals. The output of the differentiating circuit is also transmitted through a large value capacitor 120 to the input of an amplifier 122. The portion of negative signals being blocked by the diode 118 is set by a voltage divider including the resistors 116, 112 and 114 together with a resistor 124 which is connected to the junction between the resistors 112 and 114. A voltage is established across this voltage divider from the source of operating voltage indicated at B−. Voltage for operating the cathode follower 106 is obtained from a source of voltage indicated at B+. The negative pulses transmitted by the diode 118 are applied to the grid of an amplifier tube 126. These negative pulses are inverted in the process of amplification and appear as positive pulses at the plate of the amplifier tube 126. These positive pulses are transmitted through a diode 128 which transmits those pulses which are greater than a predetermined positive amplitude. These positive pulses are applied to a filter circuit 130.

The positive pulses transmitted through the capacitor 120 are amplified in the amplifier stage 122. This amplifier stage 122 is energized from the source of negative voltage at B− through the voltage divider including the resistors 116, 112 and 114. The amplifier 122 is a sharp cut-off amplifier and is biased by connection of the grid thereof through resistors 132 and 134 to the source of negative voltage at B− so that only a predetermined portion of the positive pulses applied to the grid of the tube 122 are of sufficient amplitude to raise the grid above cut-off. These positive pulses are amplified and appear across the plate resistors 136 and 138. An output signal of negative pulses at the junction of the resistors 136 and 138 is applied to the filter 130. Thus, the circuit serves to clip the center portion of the output signal from the differentiating circuit, including the capacitor 108, so that only positive pulses of greater than a predetermined amplitude and negative pulses greater in a negative direction than a predetermined amplitude are transmitted to the filter 130.

The filter 130 is a low pass filter and derives a direct current output signal which varies in polarity and magnitude in accordance with the number of positive or negative pulses applied thereto. The output of this filter circuit is therefore a varying direct current error voltage. This direct current error voltage is applied to the second stage of the direct current amplifier 82.

Figure 3:
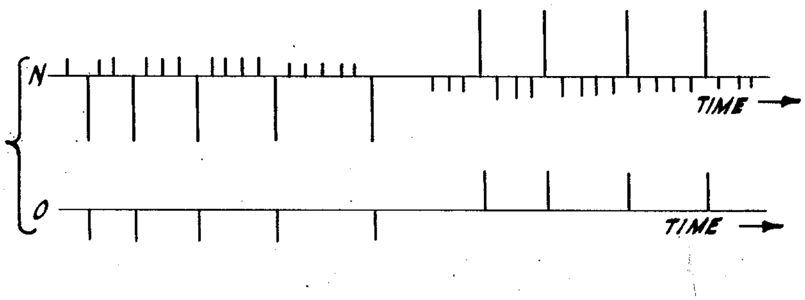
FIG. 3 shows additional waveforms of signals in the circuit schematically shown in FIG. 1.

A better understanding of the operation of the velocity control circuit can be obtained by reference to waveforms J, K, L, and M of FIG. 2 and waveforms N and O of FIG. 3.

Assuming that the speed of the rotating head wheel is decreasing, the control impulses H will be compared with the sawtooth wave G in the phase detector 57 to produce a rising staircase voltage waveform across the capacitor 104. This waveform is shown as waveform J in FIG. 2. Assuming that the speed of the head wheel is increasing, a descending staircase waveform as shown in waveform L of FIG. 2 will be produced by comparison of waveform I with waveform G in the phase detector 57. These staircase waveforms are differentiated in the differentiator including the capacitor 108 and the resistor 110. It will be observed that the staircase waveforms have gradually increasing or decreasing portions followed by a sharply decreasing or increasing portion depending upon whether speed of the head wheel is decreasing, as in the case of waveform J, or increasing as in the case of waveform L. These large increasing or decreasing portions occur when successive control pulses occur near opposite ends of the sawtooth waveforms so that the output of the phase detector is highly positive and then highly negative upon occurrence of successive control pulses. These sharp transitions between positive and negative polarities in the output voltages of the phase detector 57 will occur after a few cycles of revolutions of the head wheel. Thus, many large transitions will occur per second when the head wheel is increasing or decreasing in speed.

These stepped waveforms J or L are differentiated so as to produce a number of pulses of one polarity followed by a larger amplitude pulse of opposite polarity upon occurrence of a transition. The differentiated output signals are shown in waveform K for the case where the speed of the rotating head wheel is decreasing and in waveform M the case where the speed of the rotating head wheel is increasing.

In order to show a larger number of these pulses of the type shown in waveforms K and M, reference is had to FIG. 3 wherein the waveforms similar to waveforms K and M are shown on a longer time scale. In the case of waveform N, the speed of the head wheel is first increasing and then decreasing. It will be noticed that the output signal from the differentiator including the capacitor 108 and the resistor 110 is a series of positive pulses interlaced with larger amplitude negative pulses, followed by a series of negative voltages interlaced with a number of larger amplitude positive pulses. These pulses all would occur during a large number of cycles of rotation of the head wheel 20. The intermediate portions of the signal shown in waveform N are clipped by the positive and negative clipping circuits including the diodes 118 and 128 and the amplifiers 122 and 126 as explained above. Accordingly, the output signals from the clipping circuit which are applied to the filter 130 include only the more negative portions of the negative pulses and the more positive portions of the positive pulses. The filter circuit 130 provides a direct current output signal by filtering the signal shown in waveform O. This signal will be positive or negative and varies in amplitude in accordance with the number of successive positive or negative pulses applied to the filter 130.

For most of the speed range control is afforded by the above two phase and velocity control circuits. However, for the very low speeds, a third system is still needed. This is referred to as a coarse over-ride control circuit and is operative when the head wheel is being brought up to speed. It includes a rectifier circuit 58, which may be of the voltage doubler type, producing an output voltage depending upon the repetition rate of the control signals. Thus, when the control signals occur at a relatively low rate and are low in frequency the rectifier 58 produces a very small output voltage. On the other hand, when the control signal is repetitive at a rapid rate and at a high frequency as when the head wheel is almost up to speed, the output voltage from the rectifier is relatively high. This output voltage from the rectifier is amplified in an amplifier 140 and is therefore inverted so that positive large amplitude signals occur when the rotating head wheel is being brought up to speed which signals decrease as the head wheel approaches operating speed. The direct current output signal from the amplifier 140 is applied to the last stage of the direct current amplifier 84. The various stages 80, 82 and 84 of the direct current amplifier provide successive overriding controls over each other. This overriding control is obtained since each of the amplifier stages 80, 82 and 84 have different gains. The gain of the amplifier 80 is such that the output signal from the amlifier 80 can be no greater in amplitude than the amplitude of the error signal applied from the velocity control circuit to the amplifier 82. Thus, upon occurrence of an error signal from the velocity control circuit, this error signal will override the control of the second amplifier stage 82 by the output signal from the first amplifier stage 80. Similarly, the gain of the amplifier stage 82 is such that the output signal from the amplifier stage 82 applied to the third amplifier stage 84 is not greater in amplitude than the error signal from the coarse override control circuit. Accordingly, the coarse override control circuit exercises master control and overrides the output signals from the other two control circuits when the head wheel is being brought up to speed.

Figure 4:
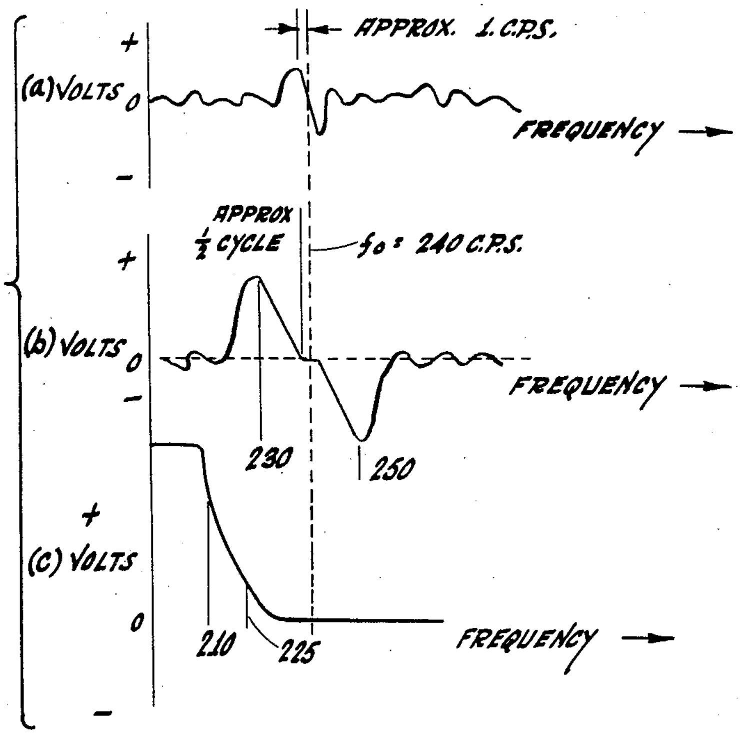
FIG. 4 is a series of curves showing the transfer characteristics of the system illustrated in FIG. 1.

The transfer characteristics of the overall control system are illustrated in FIG. 4. Curve (*a*) shows the transfer characteristics for the position and phase control circuit. It will be observed that the position and phase control circuit produces an error signal for small speed variations in the control signal around the lock-in frequency $f_0$ which, in the illustrated case, is 240 cycles per second. The phase or position control circuit is effective for approximately one cycle per second on either side of the lock-in frequency $f_0$. Curve (*b*) shows the transfer characteristics of the velocity control circuit. This control ciruit produces substantially no output immediate around the lock-in frequency $f_0$ over a speed range of approximately one cycle. It will be observed that when the control signals are approximately in phase with the reference signals, sampling and comparison between the sawtooth wave G (FIG. 2) and the control signals will occur around the time $T_0$. Accordingly, no or very few stepped waveforms having polarity transitions will appear across the output of the phase detector. Therefore, very few large amplitude pulses either positive or negative will be transmitted by the differentiating circuit including the capacitor 108 and the resistor 110. The clipping circuit will therefore remove these low amplitude pulses from the output signal which is applied to the filter and substantially no error signal will be obtained from the filter 130. The velocity control system is therefore substantially free from zero errors near lock-in frequency. The velocity detector system is, however, operative over a speed range from approximately 230 to 250 revolutions per second, for the illustrated system incorporating the rotating head wheel.

Curve (*c*) of FIG. 4 shows the transfer characteristics of the coarse override control system. It will be noted that the signal applied to the direct current amplifier is positive while the rotating head wheel is being brought up to speed. This insures that full power output from the oscillator is applied to the three phase amplifier and therefore to the motor. As the speed of the motor increases, the control voltage from the coarse override control circuit gradually decreases. This reduction in control voltage begins when the speed of the head wheel is approximately 210 revolutions per second. The frequency of the control signals is then approximately 210 pulse per second. When the speed of the head wheel increases to approximately 225 revolutions per second, the control voltage has decreased to a negligible amplitude so that the coarse override control circuit is not effective in controlling the speed of the head wheel. It will be observed that each of the control circuits operates with maximum sensitivity in different frequency and speed ranges so as to provide control of the rotating system throughout the entire speed range thereof.

From the foregoing description, it will be apparent that we have provided an improved control system by means of which greater fidelity of reproduction can be obtained in magnetic recording and reproducing by eliminating distortion due to variations in the speed at which a magnetic tape record is scanned. While we have shown a system according to our invention in diagrammatic and schematic form, various components useful therein, as well as variations in the disclosed system, all coming within the spirit of the invention, will, no doubt, readily suggest themselves to those skilled in the art. Hence, we desire that the foregoing shall be considered merely as illustrative and not in a limiting sense.

What is claimed is:

1. A control system which comprises means for providing first signals, means for providing a reference signal, means defining a first control circuit for comparing only said first signals and said reference signal, means defining a second control circuit for comparing only said first signals and said reference signal, means included in at least one of said control circuits for providing a different sensitivity of comparison by said one control circuit as compared to that of the other of said control circuits at the same time and means coupled to both of said control circuits and responsive to the comparisons by said control circuits of said first signals and said reference signal.

2. A control system according to claim 1 wherein said last named means comprises signal delay means.

3. A control system according to claim 2 wherein said signal delay means comprises means for shifting the phase of one of said first signals and said reference signal.

4. A control system which comprises means for providing control signals, means for providing reference signals, a first phase detector, a second phase detector, means responsive to one of said control and reference signals for providing pulses on occurrence thereof, means responsive to the other of said control and reference signals for providing a pair of signal waves each having sloping edge portions, at least one of said pair of signal waves having two edge portions of different slopes, one of said different slopes being lesser than that of the sloping edge portion of the other of said waves, means for applying one of said pair of signal waves to said first detector, means for applying the other of said signal waves to said second detector, signal delay means included in at least one of said last two named means for causing said one of said differently sloped edge portions of said one signal wave to occur simultaneously with said sloping edge portion of the other of said signal waves, and means for applying said pulses to both of said phase detectors for comparison therein individually with said pair of signal waves.

5. A control system which comprises a first phase detector, a second phase detector, means for providing control signals, means for providing a reference signal, means responsive to one of said control signals and reference signal for providing a pair of sawtooth waves each having differently sloping leading and trailing edge portions, signal delay means included in said last named means for delaying one of said pair of sawtooth waves so that said leading edge portion of one of said sawtooth waves and said trailing edge portion of the other of said sawtooth waves occur simultaneously, means for applying different ones of said pair of sawtooth waves individually to said first and said second phase detectors, means to apply the other of said control signals and said reference signal to said phase detectors, and control means operated by output signals from said first and said second phase detectors.

6. A control system which comprises means for providing control signals, means for providing a reference signal repetitive at a given rate, a first control circuit, a second control circuit, means included in said first control circuit for comparing only said control signals and said reference signal for deriving an error signal in response to phase variations therebetween, means included in said second control circuit for comparing only said control signals and said reference signal with a different sensitivity of comparison than that of said first control circuit for deriving an error signal in response to frequency variations therebetween, and control means operated by said error signals from both said control circuits.

7. A control system which comprises a first phase detector, a second phase detector, means for providing control signals, means for providing reference signals, means responsive to one of said control signals and reference signals for providing a pair of sawtooth waves each having a gradually sloping leading edge and a more sharply sloping retrace edge with said retrace edge of one of said waves occurring during occurrence of said leading edge of the other of said waves, means for applying one of said sawtooth waves to one of said phase detectors, means for applying the other of said sawtooth waves to the other of said phase detectors, means for applying the other of said reference and control signals individually to said first and said second phase detectors, means coupled to said first phase detector for deriving an output signal indicative of the rate of change of signals applied thereto, and control means operated by said last named means and said second phase detector.

8. A control system for apparatus having a movable element which comprises means responsive to the speed of said element for providing control signals repetitive at a rate determined by said speed, means for providing a first reference signal repetitive at a given rate, a control circuit including a first phase detector, another control circuit including a second phase detector, means included in said circuits for applying only said control signals and said first reference signal individually to said first and second phase detectors, means included in said last named means for shifting the phase of said first reference signal to produce a second reference signal repetitive at said given rate and applying said first and second reference signals shifted in phase with respect to each other individually to said first phase detector and said second phase detector, means included in at least one of said control circuits for providing different sensitivities of comparison by said phase detectors at the same time, electrical signal operated means for controlling the speed of said moving element, means for applying signals from said first phase detector to said control means, and means responsive to the output signal from said second phase detector for providing a signal indicative of the rate of change thereof and for applying said signal to said control means.

9. For use in a magnetic recording and reproducing apparatus including a plurality of magnetic heads, a rotatable wheel on which said heads are mounted, and means for rotating said wheel to scan said record; a control system comprising means for providing control signals repetitive during each cycle of rotation of said wheel, means for providing reference signals repetitive at a given rate, a first phase detector, a second phase detector, means responsive to said reference signals for providing a square wave having a repetition rate equal to the repetition rate of said reference signals, a differentiating circuit for differentiating said square wave to provide impulses having a repetition rate twice the repetition rate of said reference signals, a pair of wave generators for producing waves having sloping trailing edges, means for coupling said differentiating circuit to said generators for triggering said generators to produce said trailing edges of said waves generated therein upon occurrence of alternate ones of said pulses from said differentiating circuit, means for coupling one of said generators to said first phase detector, means for coupling the other of said generators to said second phase detector, means for applying said control signals to said first and said second phase detectors for comparison therein with said waves from said generators to provide an error signal in response to variations therebetween, means for deriving an output signal indicative of the rate of change of said error signal from said second phase detector, override means responsive to said control signals for providing an output signal when said control signals have a frequency less than a predetermined frequency, means for combining said error signal from said first phase detector, said output signal from said rate of change determining means and said output signal from said override means such that said signals have progressively greater effects, and means for controlling the speed of said wheel in response to the output signal from said combining means.

References Cited by the Examiner

UNITED STATES PATENTS

| | | | |
|---|---|---|---|
| 2,517,703 | 8/50 | Offner | 179—15 |
| 2,774,927 | 12/56 | Evans | 179—100.25 |
| 2,780,668 | 2/57 | Farr et al. | 318—314 X |
| 2,782,355 | 2/57 | Wilcox | 328—133 X |
| 2,798,997 | 7/57 | Curtis | 318—318 |
| 2,813,241 | 11/57 | Smith et al. | 328—134 X |
| 2,848,537 | 8/58 | Richman | 178—5.4 XR |
| 2,854,526 | 9/58 | Morgan | 179—100.25 |
| 2,866,012 | 12/58 | Ginsburg et al. | 178—6.6 |
| 2,868,975 | 1/59 | Harris et al. | 328—133 X |
| 2,890,270 | 6/59 | Richman | 178—5.4 |
| 2,910,581 | 10/59 | Richman | 178—5.4 XR |
| 2,913,652 | 11/59 | Greenberg et al. | 318—309 |
| 2,920,263 | 1/60 | Curtis | 332—36 XR |
| 2,921,990 | 1/60 | Ginsburg et al. | 178—6.6 |
| 2,932,793 | 4/60 | Smith et al. | 328—134 |
| 2,942,061 | 6/60 | Pfost et al. | 178—6.6 |
| 2,943,263 | 6/60 | Czina et al. | 328—134 |
| 3,017,462 | 1/62 | Clark et al. | 178—6.6 XR |

FOREIGN PATENTS 762,699 12/56 Great Britain.

OTHER REFERENCES

Ampex Corporation Technical Notes on Ampex VR-1000.

DAVID G. REDINBAUGH, *Primary Examiner.*

NEWTON N. LOVEWELL, ROY LAKE, *Examiners.*